(12) United States Patent
Latapie et al.

(10) Patent No.: US 10,812,523 B2
(45) Date of Patent: Oct. 20, 2020

(54) ADAPTIVE UNION FILE SYSTEM BASED PROTECTION OF SERVICES

(71) Applicant: Cisco Technology, Inc., San Jose, CA (US)

(72) Inventors: Hugo Latapie, Long Beach, CA (US); Enzo Fenoglio, Issy-les-Moulineaux (FR); Pascal Thubert, La Colle sur Loup (FR); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 15/896,182

(22) Filed: Feb. 14, 2018

(65) Prior Publication Data

US 2019/0253452 A1 Aug. 15, 2019

(51) Int. Cl.
| | | |
|---|---|---|
| H04L 29/06 | (2006.01) | |
| G06N 3/08 | (2006.01) | |
| G06N 20/00 | (2019.01) | |
| G06F 16/18 | (2019.01) | |

(52) U.S. Cl.
CPC ...... *H04L 63/1458* (2013.01); *G06F 16/1815* (2019.01); *G06N 3/088* (2013.01); *G06N 20/00* (2019.01); *H04L 63/1416* (2013.01)

(58) Field of Classification Search
CPC ............. H04L 63/1458; H04L 63/1416; G06F 16/1815; G06N 20/00; G06N 3/088
See application file for complete search history.

(56) References Cited

U.S. PATENT DOCUMENTS

| | | |
|---|---|---|
| 7,463,590 B2 | 12/2008 | Mualem et al. |
| 8,650,434 B2 | 2/2014 | Orsini et al. |
| 8,887,280 B1 | 11/2014 | Dickinson et al. |

(Continued)

FOREIGN PATENT DOCUMENTS

CN 202231744 U 5/2012

OTHER PUBLICATIONS

White et al., "LegionFS: A Secure and Scalable File System Supporting Cross-Domain High-Performance Applications", SC2001; pp. 1-11.

(Continued)

*Primary Examiner* — Shin-Hon (Eric) Chen
*Assistant Examiner* — Jessica J South
(74) *Attorney, Agent, or Firm* — Behmke Innovation Group LLC; Kenneth J. Heywood; Jonathon P. Western (57) ABSTRACT

In one embodiment, a device maintains a journal of uncommitted changes to a file system of the device in a layer that is hot-swappable with a writable container layer. The device augments the journal with metadata regarding a particular uncommitted change to the file system of the device. The device applies, within a sandbox environment of the device, a machine learning-based anomaly detector to the particular uncommitted change to the file system and the metadata regarding the change, to determine whether the particular uncommitted change to the file system is indicative of a destruction of service attack on the device. The device causes performance of a mitigation action when the machine learning-based anomaly detector determines that the particular uncommitted change to the file system is indicative of a destruction of service attack on the device.

20 Claims, 6 Drawing Sheets

(56) References Cited

U.S. PATENT DOCUMENTS

| | | | |
|---|---|---|---|
| 2010/0122343 A1* | 5/2010 | Ghosh | G06F 21/55 |
| | | | 726/23 |
| 2017/0093923 A1 | 3/2017 | Duan | |
| 2017/0185436 A1* | 6/2017 | Deng | G06F 9/45558 |
| 2019/0065407 A1* | 2/2019 | Kinzinger | G06F 9/3013 |
| 2019/0089721 A1* | 3/2019 | Pereira | H04L 63/1416 |
| 2019/0166141 A1* | 5/2019 | Xu | G06N 3/0472 |

OTHER PUBLICATIONS

Zadok et al., "On incremental file system development", ACM Transactions on Storage (TOS), vol. 2 Issue 2, May 2006, pp. 161-196, ACM.

Zadok, Erez., "Stackable File Systems as a Security Tool", Technical Report CUCS-036-99, 19 pages, 1999, Computer Science Department, Columbia University.

About storage drivers | Docker Documentation https://docs.docker.com/storage/storagedriver/#images-and-layers; pp. 1-2.

Inotify—Wikipedia; https://en.wikipedia.org/wiki/Inotify; pp. 1-2.

Ext4—Wikipedia; https://en.wikipedia.org/wiki/Ext4; pp. 1-5.

UnionFS—Wikipedia; https://en.wikipedia.org/wiki/UnionFS; pp. 1-2.

2015 Bologna; Bologna 4/5 Dec. 2015; Drupal Day; pp. 1-37.

Cisco warns of DeOS attacks—Enterprise Times https://www.enterprisetimes.co.uk/2017/07/24/cisco-warns-deos-attacks/; pp. 1-4.

\* cited by examiner

ADAPTIVE UNION FILE SYSTEM BASED PROTECTION OF SERVICES

TECHNICAL FIELD

The present disclosure relates generally to computer networks, and, more particularly, to an adaptive union file system based protection of services.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

Recently, a new form of attack has emerged in which the goal is not the exfiltration of data, or even holding the data hostage, as in the case of ransomware, but the destruction of data on the targeted device, so as to inhibit services of the device. While backup strategies can somewhat mitigate the effects of these so-called destruction of service (DeOS) attacks, there is also an associated cost to this approach in terms of the time needed to restore the data, assuming that the data is recoverable. In addition, any deltas between the state of the system just prior to attack and the backed up state will be lost.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device maintains a journal of uncommitted changes to a file system of the device in a layer that is hot-swappable with a writable container layer. The device augments the journal with metadata regarding a particular uncommitted change to the file system of the device. The device applies, within a sandbox environment of the device, a machine learning-based anomaly detector to the particular uncommitted change to the file system and the metadata regarding the change, to determine whether the particular uncommitted change to the file system is indicative of a destruction of service attack on the device. The device causes performance of a mitigation action when the machine learning-based anomaly detector determines that the particular uncommitted change to the file system is indicative of a destruction of service attack on the device.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
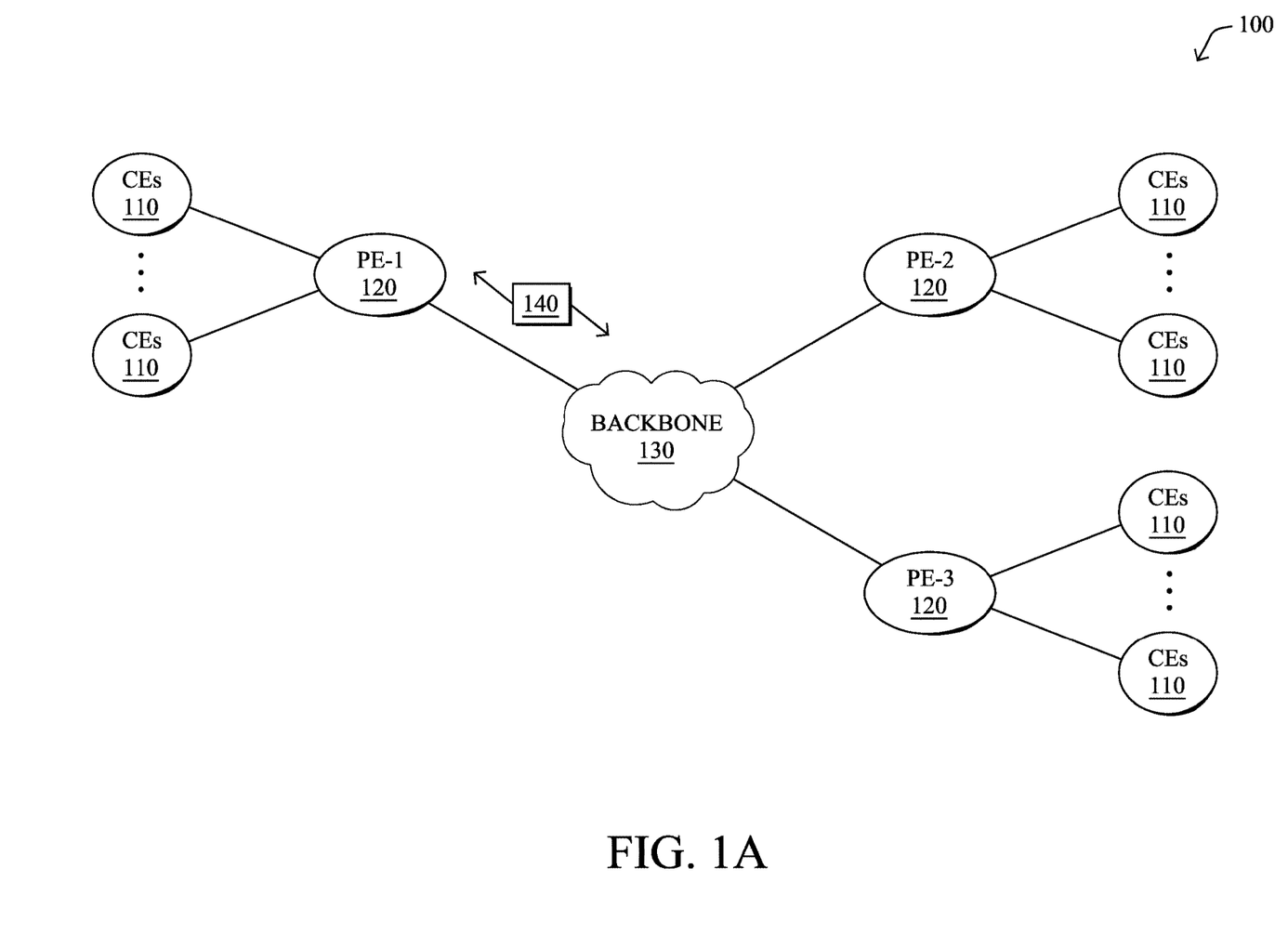
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
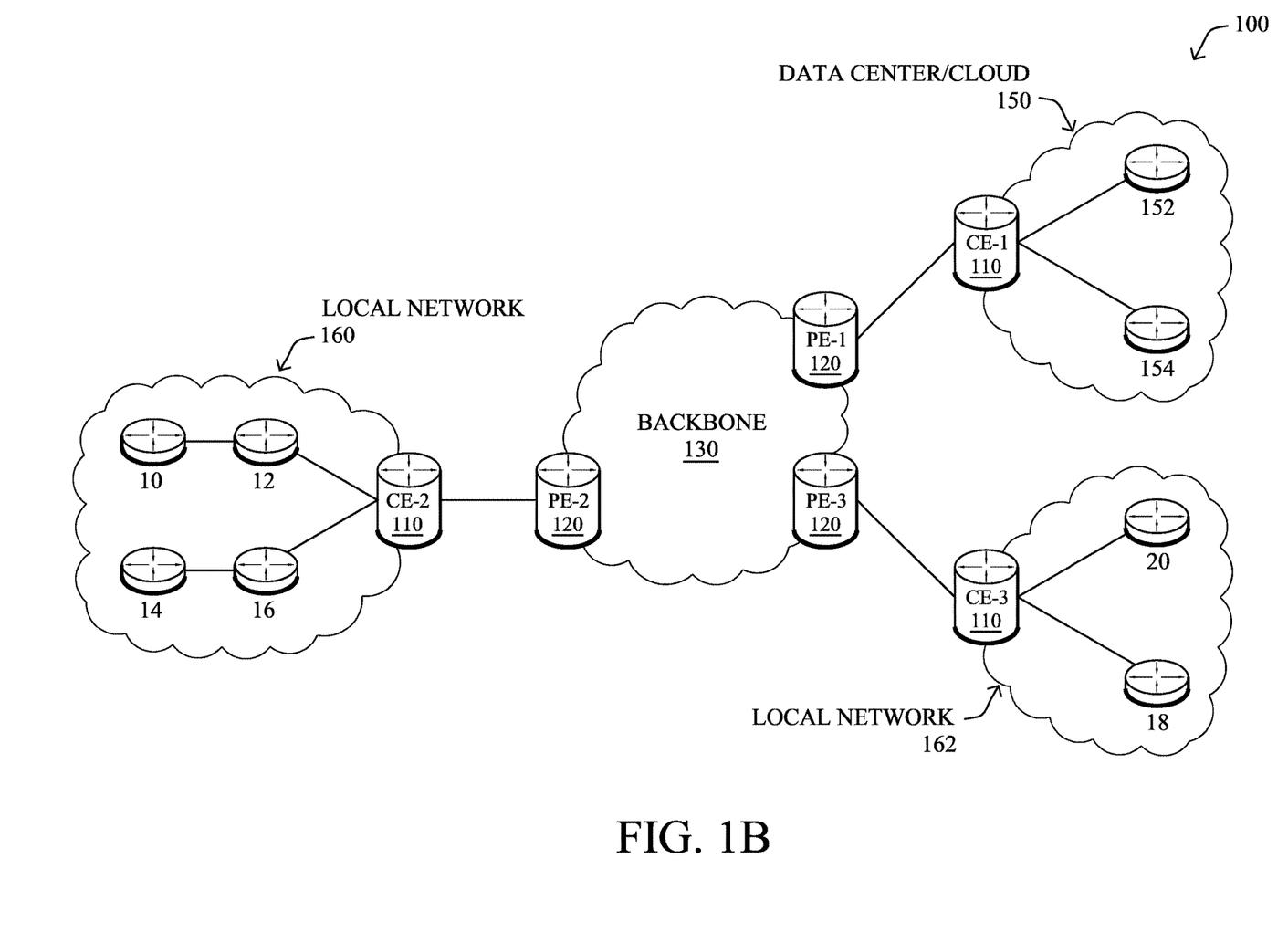

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic is locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
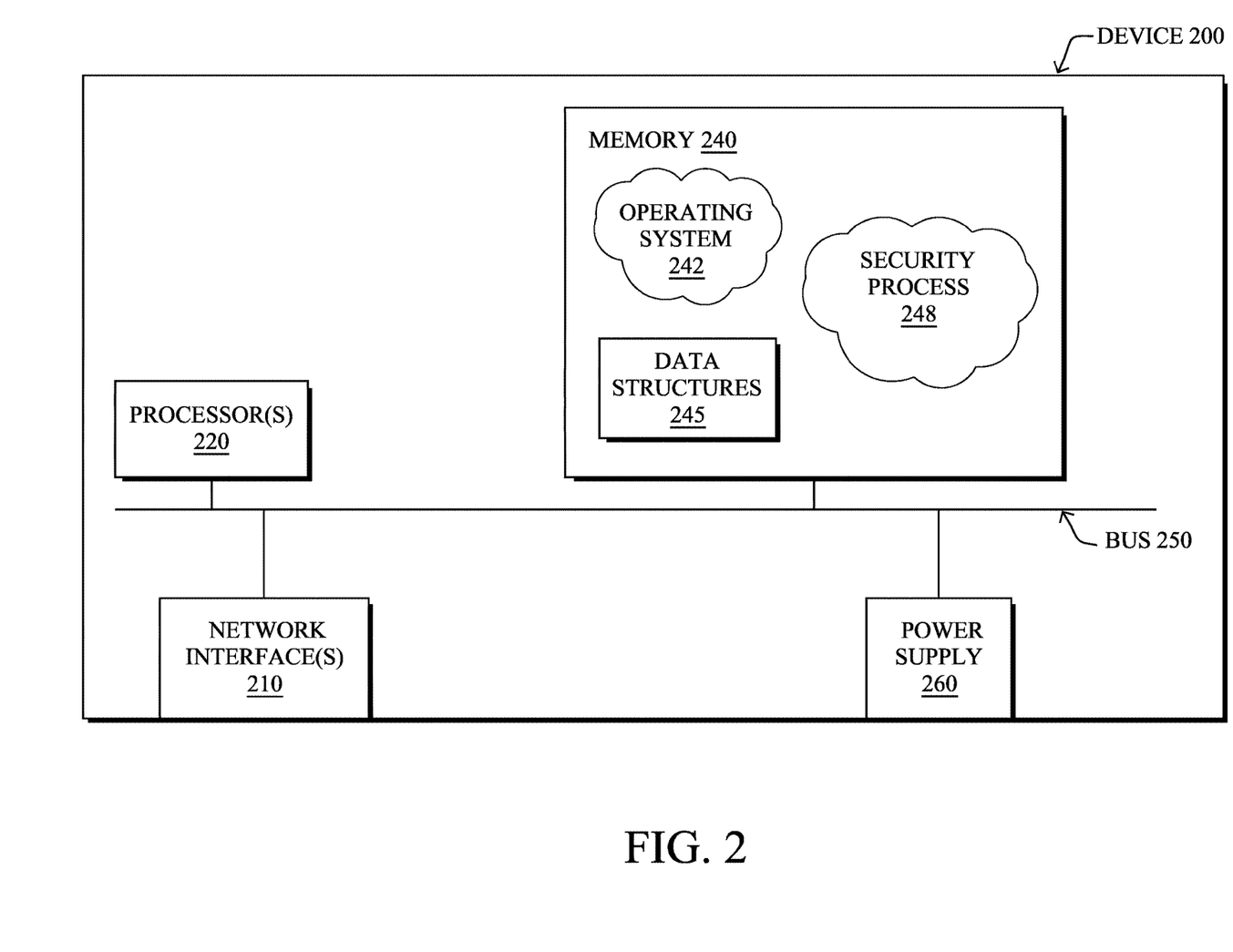
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., Linux, another operating system, etc.), portions of which are typically resident in memory 240 and executed by the processor(s), functionally organizes the node by, inter alia, invoking network operations in support of software processors and/or services executing on the device. These software processors and/or services may comprise a security process 248 (e.g., routing services), as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, destruction of service (DeOS) attacks present a real and significant form of attack that is growing in popularity. Notably, recent IoT botnet activity suggests that some attackers are already laying the basis for a high-impact attack event that could potentially disrupt the Internet itself.

Adaptive Union File System Based Protection of Services

The techniques herein introduce an adaptive union file system approach that aids in the protection of services from DeOS attacks. In some aspects, the techniques herein maintain a journal on hot-swappable memory of file system changes (e.g., union file system layers) that have not yet committed. In further aspects, such changes may be validated in a sandbox environment before committing the changes to the file system as immutable layers. The validation may entail, in some embodiments, application of a machine learning-based anomaly detector, to determine whether the uncommitted changes are indicative of a DeOS attack.

Specifically, according to one or more embodiments of the disclosure as described in detail below, a device maintains a journal of uncommitted changes to a file system of the device in a layer that is hot-swappable with a writable container layer. The device augments the journal with metadata regarding a particular uncommitted change to the file system of the device. The device applies, within a sandbox environment of the device, a machine learning-based anomaly detector to the particular uncommitted change to the file system and the metadata regarding the change, to determine whether the particular uncommitted change to the file system is indicative of a destruction of service attack on the device. The device causes performance of a mitigation action when the machine learning-based anomaly detector determines that the particular uncommitted change to the file system is indicative of a destruction of service attack on the device.

Illustratively, the techniques described herein may be performed by hardware, software, and/or firmware, such as in accordance with the security process 248, which may include computer executable instructions executed by the processor 220 (or independent processor of interfaces 210) to perform functions relating to the techniques described herein.

Operationally, the techniques herein may employ the use of a union file system on is the protected device. In general, the move to scalable, distributed microservices executed in their own, individual virtualized environments has led to the development of storage mechanisms that minimize redundant information. Union file systems, such as UnionFS in Linux, and the like, represent one potential approach to minimizing the redundant information used by the various virtualized environments.

In recent years, there has been a move away from virtualizing services within virtual machines (VMs) in favor of using containers. Typically, a VM, like its name implies, acts as a virtualized machine, thereby virtualizing all of the hardware, as well as software, of the machine. This means that each VM executes not only a full copy of the operating system, but also has to virtualize all of the hardware needed, to run the specific program. In contrast, containers leverage the fact that many of the components that would be virtualized by each of the VMs in an implementation are redundant and/or unnecessary to execute the microservices. Notably, a container may only use the portions of the operating system, libraries, and system resources that are required to run the microservice, which significantly cuts down on the resource requirements when compared to VMs.

Figure 3:
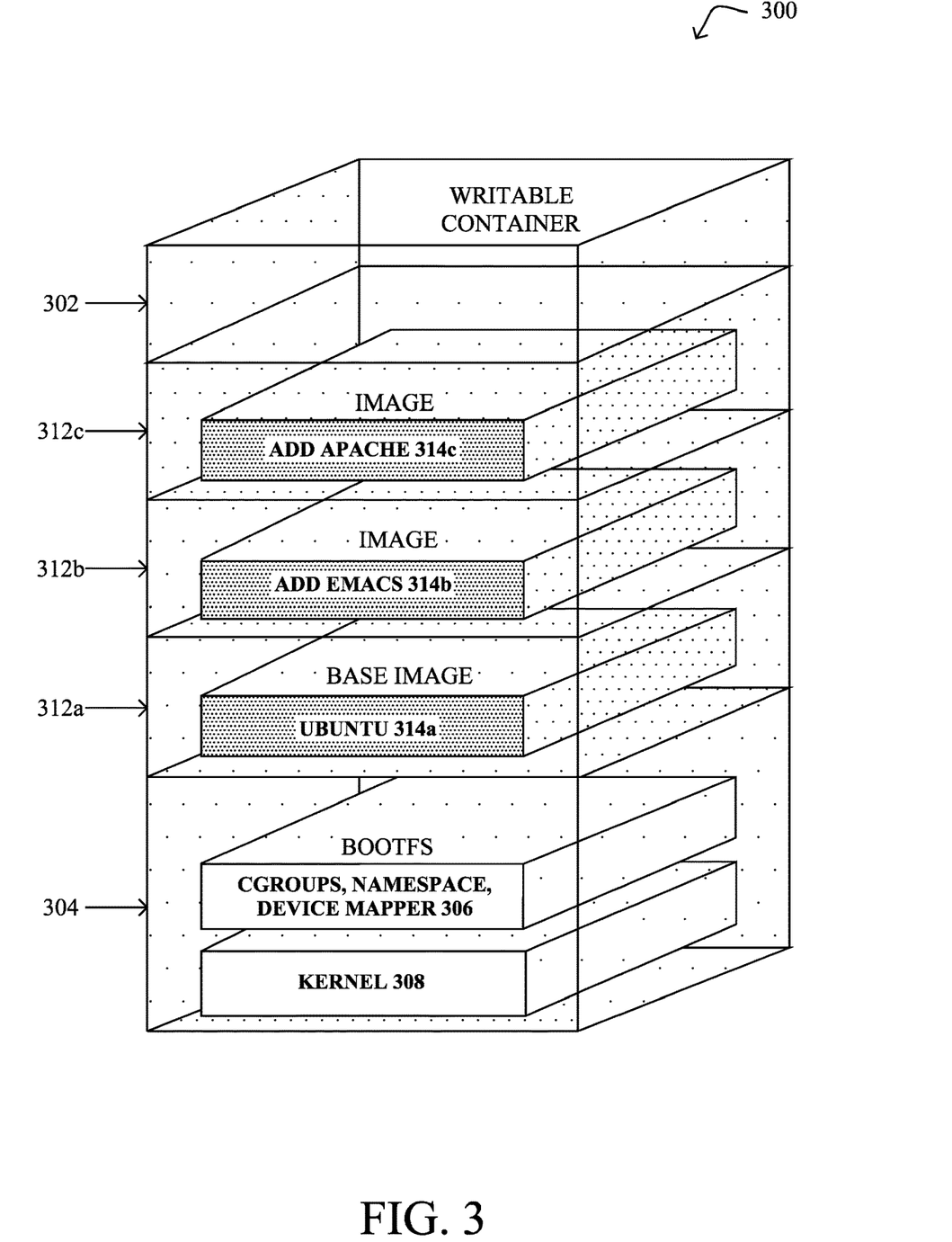
FIG. 3 illustrates an example of a container in conjunction with a union file system.

One example of a container platform for Linux is Docker. In essence, the Docker engine executes on top of the operating system and provides a mechanism for the different containers to share the operating system resources. This allows each container to bundle only the application and the binaries and/or libraries that it needs to execute. In addition, a union file system can be used in conjunction with Docker and other container platforms, to further reduce redundant information and efficiently store data. FIG. 3 illustrates an example 300 of a container on top of such a file system.

As shown in FIG. 3, a Docker image may be constructed from a series of "layers" that are defined in a corresponding Dockerfile. Each layer is essentially a set of differences from that of the previous layer, allowing layers to be stacked. For example, a base image 312a of the particular operating system 314a (e.g., Ubuntu) may be formed on top of the bootfs 304 of the device, which includes kernel 308 and various functions 306 (e.g., cgroups, the namespace, a device mapper, etc.). On top of base image 312a may be a second image 312b that adds application 314b (e.g., emacs) for use. Similarly, image 312c may also add an HTTP server application 314c (e.g., Apache) for use.

During use, each image layer 312 is read-only. When a new container is created, a writable container layer 302 is also created and sits on top of the read-only layers 312. In turn, all changes that add or modify existing data are made in writeable container layer 302. When the container is deleted, so is writable container layer 302. In other words, there are two general categories of layers: 1.) immutable layers that cannot be changed by the container (i.e., are read-only), and 2.) a writable layer. By making the layers below the writable layer immutable, these layers can be shared by leveraging a copy on write mechanism.

According to various embodiments, the techniques herein introduce a secure storage proxy that can dynamically switch between the writable container layer and a hot-swap writable layer, when a DeOS attack is detected. The data in the hot-swap layer will lag by some predefined amount from the state of the primary writeable layer. In addition, the hot-swap layer may use an augmented journaling mechanism for the delta between the last immutable and validated layer. This journaling mechanism can be used to rapidly restore the device to the last stable state.

Figure 4:
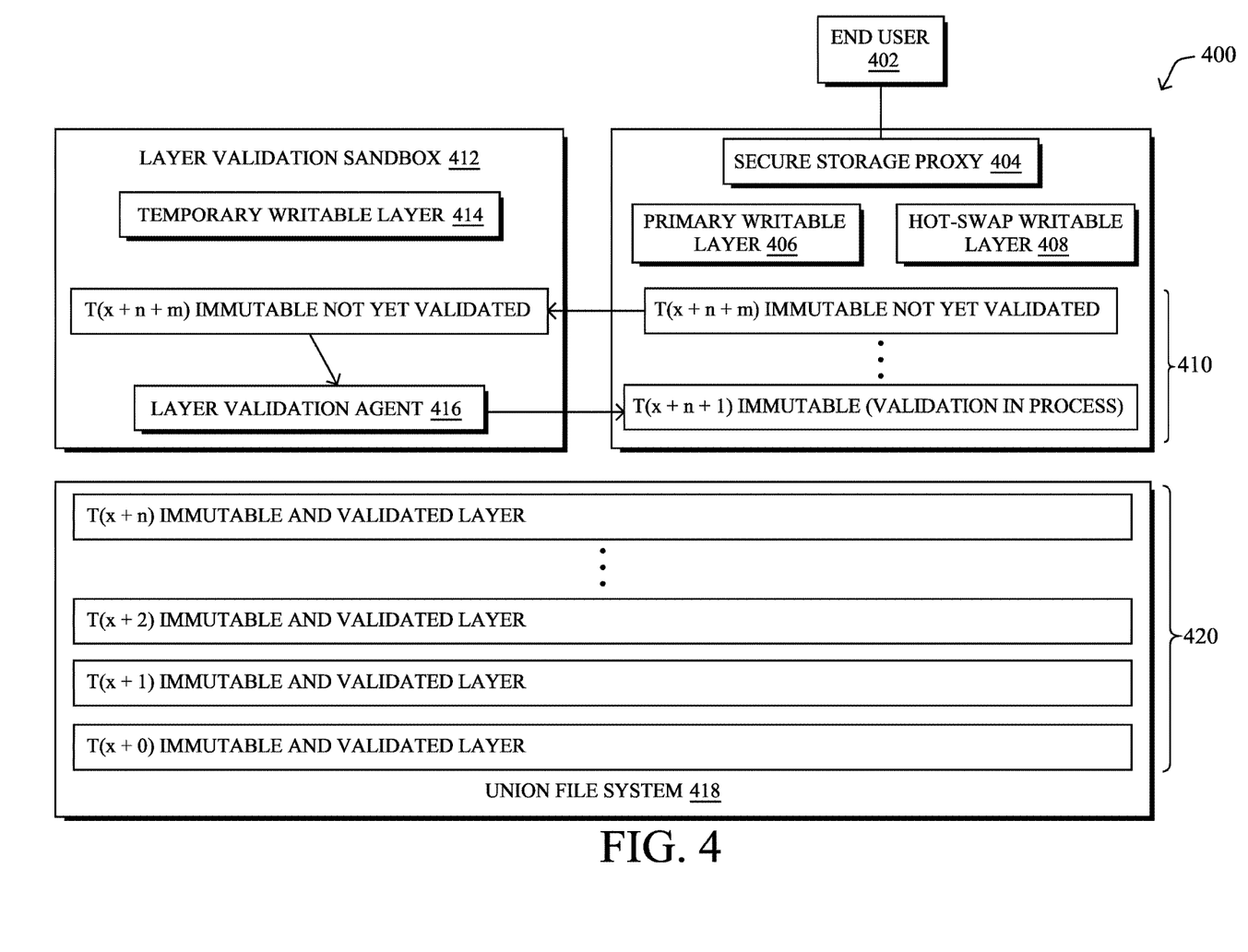
FIG. 4 illustrates an example architecture for an adaptive union file system to protect containerized services.

FIG. 4 illustrates an example architecture 400 for an adaptive union file system to protect containerized services, according to various embodiments. As shown, the executing device may include a union file system 418, such as UnionFS in Linux, or the like. In general, a union file system allows the files and directories present in different file systems to be cohesively overlaid, thereby treating the disparate files and directories as belonging to a single file system. Stored within union file system 418 may be layers 420, such as a base layer associated with a transaction T(x+0), a second layer associated with transaction T(x+1), up to a top layer associated with transaction T(x+n). Each of these layers 420 may be immutable (e.g., read-only) and, in some cases, shared across containers. The techniques herein leverage the fact that any DeOS attack requires the destruction of massive amounts data, which is intrinsically impossible when the majority of an enterprise's (or other entity) data resides in an immutable form. The immutability of layers 420 in file system 418 can further be supported by custom application-specific integrated circuits (ASICs) and/or hardware that enforce the immutable nature of the media in a much more secure and robust manner.

In various embodiments, architecture 400 may include a secure storage proxy 404 that processes any data changes made by an end user device 402 via a containerized application. For example, assume that end user device 402 initiates layers 410 associated with transactions T(x+n+1) through T(x+n+m) that may be written to primary writable layer 406. However, rather than simply committing these changes by writing layers 410 to file system 418, secure storage proxy 404 may first validate the individual layers 410 before adding them to file system 418.

To help mitigate against DeOS attacks, secure storage proxy 404 may include a hot-swap writable layer 408 that is hot-swappable with the primary writable layer 406 of the container. Such a swap may be performed, for example, when a DeOS attack is detected. In some embodiments, a journal may be maintained on hot-swappable layer 408 that tracks the delta between the last immutable layer 420 in file system 418 (e.g., the layer 420 associated with transaction T(x+n)) and the validated layer 410 (e.g., the layer 410 associated with transaction T(x+n+1) that has not yet been written/committed to file system 418.

An isolation mechanism can also be used with respect to hot-swap writable layer 408, to help protect layer 408 from outside changes. Cgroups, for example, is a Linux kernel feature that can be used to limit and isolate the resources associated with a collection of processes. This can be used to isolate hot-swappable writable layer 408 from access by other processes outside of secure storage proxy 404. In addition, cryptographic protection can be applied to hot-swappable writable layer 408 through the use of software and/or hardware, such as cryptographic ASICs. For example, the journal maintained in layer 408 may require an off-board, asymmetric key for clearing and other sensitive operations. If validation of a layer 410 fails (e.g., the associated transaction is indicative of a DeOS attack), the journal in layer 408 can be used to restore the system to its last stable state. In addition, the data in hot-swap writable layer 408 may lag by some predefined amount, in comparison to the state of the primary writable layer 406.

In various embodiments, as shown, secure storage proxy 404 may leverage a layer validation sandbox 412 that can validate layers 410, prior to adding the layers to file system 418. For example, consider layer 410 associated with transaction T(x+n+m) that is immutable, but not yet validated. In such a case, secure storage proxy 404 may write this layer 410 to a temporary writable layer 414 of sandbox 412, thereby allowing a layer validation agent 416 to determine whether the layer 410 under consideration is valid or indicative of a DeOS attack. In some implementations, validation sandbox 412 may validate layers 410 in batch mode. However, in further implementations, layer validation agent 416 may be configured to validate layers 410 in online mode by augmenting the journal with metadata such as:

Executable program signature delta's detected via file system change detection systems, such as inotify in Linux, or the like Dynamic memory verification information Pertinent workload signatures of changes to file system 418

Other information that can accelerate later layer validation processing

During operation, layer validation agent 416 may perform anomaly detection, to determine whether a given layer 410 is anomalous and potentially indicative of a DeOS attack. In other words, layer validation agent 416 may assess the journal and metadata for the layer 410 under assessment, to determine whether it is anomalous. In general, anomaly detection attempts to identify patterns that do not conform to an expected behavior. However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of a malicious attack (e.g., a DeOS attack) and/or a misbehaving device. This is particularly powerful for the detection of unknown attack patterns (e.g., no static signatures).

In some embodiments, the anomaly detector of layer validation agent 416 may use machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in architecture 400, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like. In particular, a generative adversarial-trained deep variational auto-encoder is contemplated for the anomaly detector of layer validation agent 416.

In addition to anomaly detection, layer validation agent 416 may leverage other techniques as well, such as blacklisting or whitelisting, to detect usage patterns that are consistent with an attack. For example, a local resource being used and/or the identity of end user device 402 may be a useful clue as to whether or not a DeOS attack is underway.

If a layer 410 has been validated by layer validation agent 416, secure storage proxy 404 may then add the layer to union file system 418, as normal. However, if layer validation agent 416 determines that the layer is anomalous or otherwise indicative of an attack, secure storage proxy 404 may cause the performance of any number of mitigation actions. For example, secure storage proxy 404 may not write the layer 410 under scrutiny to union file system 418. Other responses to a suspected attack may include, but are not limited to, any or all of the following:

- Reducing access to direct physical access only via console of the device
- Reducing access only to whitelisted IP addresses, users, etc.
- Coordinating with network resources such as firewalls, encrypted traffic analysis, malware detection, etc. via secure in-band or out of band communications.

Repeat attacks can also be handled in a similar fashion as above by leveraging out-of-band mechanisms to learn and share attack signatures. At a minimum, additional metadata can be shared between devices via secure channels, such as with other security products. In addition, this metadata regarding system health and attack activity could also be provided to human operators in an interpretable manner to assist in attack response and remediation.

Said another way, sandbox 412 and layer validation agent 416 implement any or all of the following, to validate a layer 410:

- Executable program signature verification
- Memory verification
- "Time warping" moving forward in time in a manner not easily detectable by malicious software to activate time based triggers
- Analysis of workloads (e.g., access rights, execution patterns, network activity, . . . )

In addition, layer validation agent 416 may optionally create a cryptographic chain of trust using digitally signatures and cipher block chaining mode encryption.

Figure 5:
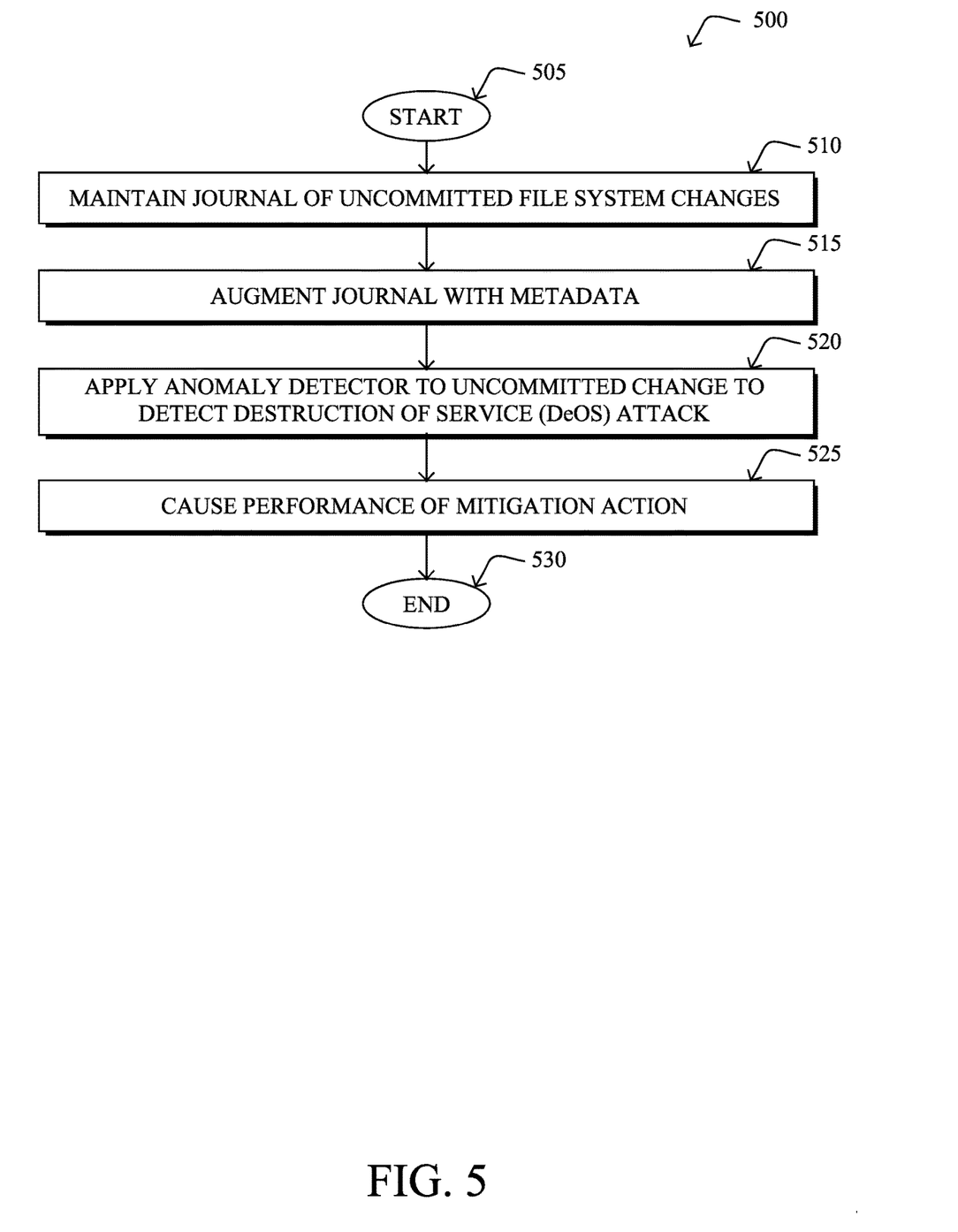
FIG. 5 illustrates an example simplified procedure for implementing an adaptive file system to protect services.

FIG. 5 illustrates an example simplified procedure 500 for implementing an adaptive file system to protect services, in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, the device may maintain a journal of uncommitted changes to a file system of the device in a layer that is hot-swappable with a writable container layer. For example, the journal may track the deltas between a layer to be written to a union file system that stores a stack of immutable layers and that of a layer that has not yet been validated for writing to the file system. Such a hot-swap layer and journal can be used, in various embodiments, to restore the system to the last stable state (e.g., by switching to the hot-swappable layer when an attack is detected).

At step 515, as detailed above, the device may augment the journal with metadata regarding a particular uncommitted change to the file system of the device. For example, in the case of a given layer being written to the file system, the device may associate the layer information in the journal with other information regarding workload signatures, changes in the signature of the executing program's signatures, etc.

At step 520, the device may apply, within a sandbox environment of the device, a machine learning-based anomaly detector to the particular uncommitted change to the file system and the metadata regarding the change, as described in greater detail above. In doing so, the device may determine whether the particular uncommitted change to the file system is indicative of a destruction of service (DeOS) attack on the device. For example, the device may evaluate the layer in a temporary writable layer, to determine whether the journal information and metadata associated with the layer are indicative of an attack.

At step 525, as detailed above, the device may cause the performance of a mitigation action when the machine learning-based anomaly detector determines that the particular uncommitted change to the file system is indicative of a destruction of service attack on the device. For example, the device may restrict all outside access to a physical console of the device, a whitelisted subset of users or devices, or the like. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, help protect against DeOS attacks by validating layers before being added to a union file system. In some aspects, anomaly detection may be applied to the un-validated layers, to detect a potential DeOS attack. In turn, the system may cause the performance of a mitigation action, in defense against the attack.

While there have been shown and described illustrative embodiments that provide for the protection of services against DeOS attacks, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    maintaining, by a device, a journal of uncommitted changes to a file system of the device in a layer that is hot-swappable with a writable container layer, wherein the journal characterizes a delta between an immutable layer last written to the file system and a layer not yet written to the file system;
    augmenting, by the device, the journal with metadata regarding a particular uncommitted change to the file system of the device;
    applying, by the device and within a sandbox environment of the device, a machine learning-based anomaly detector to the particular uncommitted change to the file system and the metadata regarding the change, to determine whether the particular uncommitted change to the file system is indicative of a destruction of service attack on the device; and
    causing, by the device, performance of a mitigation action when the machine learning-based anomaly detector determines that the particular uncommitted change to the file system is indicative of a destruction of service attack on the device.

2. The method as in claim 1, wherein the uncommitted changes to the file system would add one or more immutable files to the file system once committed.

3. The method as in claim 1, wherein the mitigation action comprises causing a network security service to block traffic associated with a remote entity that initiated the particular uncommitted change.

4. The method as in claim 1, wherein the mitigation action comprises reducing access to the device allowing only direct physical access to the device via a console of the device.

5. The method as in claim 1, wherein the metadata is indicative of workload signatures of changes to the file system that are related to the particular uncommitted change to the file system.

6. The method as in claim 1, wherein the metadata is indicative of one or more file system changes made to an executable application associated with the particular uncommitted change to the file system.

7. The method as in claim 1, wherein the machine learning-based anomaly detector comprises a variational autoencoder trained using a generative adversarial network.

8. The method as in claim 1, wherein the file system is a union file system.

9. The method as in claim 1, wherein the mitigation action comprises switching from the writable container layer to the hot-swappable layer in which the journal is maintained.

10. An apparatus, comprising:
    one or more network interfaces to communicate with a network;
    a processor coupled to the network interfaces and configured to execute one or more processes; and
    a memory configured to store a process executable by the processor, the process when executed configured to:
        maintain a journal of uncommitted changes to a file system of the apparatus in a layer that is hot-swappable with a writable container layer, wherein the journal characterizes a delta between an immutable layer last written to the file system and a layer not yet written to the file system;

augment the journal with metadata regarding a particular uncommitted change to the file system of the apparatus;

apply, within a sandbox environment of the apparatus, a machine learning-based anomaly detector to the particular uncommitted change to the file system and the metadata regarding the change, to determine whether the particular uncommitted change to the file system is indicative of a destruction of service attack on the apparatus; and cause performance of a mitigation action when the machine learning-based anomaly detector determines that the particular uncommitted change to the file system is indicative of a destruction of service attack on the apparatus.

11. The apparatus as in claim 10, wherein the uncommitted changes to the file system would add one or more immutable files to the file system once committed.

12. The apparatus as in claim 10, wherein the mitigation action comprises causing a network security service to block traffic associated with a remote entity that initiated the particular uncommitted change.

13. The apparatus as in claim 10, wherein the mitigation action comprises reducing access to the apparatus allowing only direct physical access to the apparatus via a console of the apparatus.

14. The apparatus as in claim 10, wherein the metadata is indicative of workload signatures of changes to the file system that are related to the particular uncommitted change to the file system.

15. The apparatus as in claim 10, wherein the metadata is indicative of one or more file system changes made to an executable application associated with the particular uncommitted change to the file system.

16. The apparatus as in claim 10, wherein the machine learning-based anomaly detector comprises a variational autoencoder trained using a generative adversarial network.

17. The apparatus as in claim 10, wherein the file system is a union file system.

18. The apparatus as in claim 10, wherein the mitigation action comprises switching from the writable container layer to the hot-swappable layer in which the journal is maintained.

19. A tangible, non-transitory, computer-readable medium storing program instructions that cause a device to execute a process comprising:

maintaining, by the device, a journal of uncommitted changes to a file system of the device in a layer that is hot-swappable with a writable container layer, wherein the journal characterizes a delta between an immutable layer last written to the file system and a layer not yet written to the file system;

augmenting, by the device, the journal with metadata regarding a particular uncommitted change to the file system of the device;

applying, by the device and within a sandbox environment of the device, a machine learning-based anomaly detector to the particular uncommitted change to the file system and the metadata regarding the change, to determine whether the particular uncommitted change to the file system is indicative of a destruction of service attack on the device; and causing, by the device, performance of a mitigation action when the machine learning-based anomaly detector determines that the particular uncommitted change to the file system is indicative of a destruction of service attack on the device.

20. The computer-readable medium as in claim 19, wherein the metadata is indicative of workload signatures of changes to the file system that are related to the particular uncommitted change to the file system.

* * * * *

UNITED STATES PATENT AND TRADEMARK OFFICE
CERTIFICATE OF CORRECTION

PATENT NO. : 10,812,523 B2
APPLICATION NO. : 15/896182
DATED : October 20, 2020
INVENTOR(S) : Hugo Latapie et al.

Page 1 of 1

It is certified that error appears in the above-identified patent and that said Letters Patent is hereby corrected as shown below:

In the Specification

In Column 4, Line 15, please amend as shown:
geographic locations.

In Column 5, Line 32, please amend as shown:
system bus 250, and is powered by a power supply 260.

In Column 6, Line 48, please amend as shown:
of a union file system on the protected device. In general, Signed and Sealed this
Nineteenth Day of January, 2021

Andrei Iancu
*Director of the United States Patent and Trademark Office*